(12) United States Patent
Takaoka et al.

(10) Patent No.: US 8,046,391 B2
(45) Date of Patent: Oct. 25, 2011

(54) STORAGE APPARATUS AND ITS FILE CONTROL METHOD AND STORAGE SYSTEM

(75) Inventors: Nobumitsu Takaoka, Sagamihara (JP);
Hitoshi Kamei, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 305 days.

(21) Appl. No.: 12/489,055

(22) Filed: Jun. 22, 2009

(65) Prior Publication Data

US 2010/0250626 A1    Sep. 30, 2010

(30) Foreign Application Priority Data

Mar. 25, 2009 (JP) ................................. 2009-073435

(51) Int. Cl.
*G06F 7/00* (2006.01)
(52) U.S. Cl. ......... 707/812; 707/821; 709/201; 715/255
(58) Field of Classification Search .................... 707/812
See application file for complete search history.

(56) References Cited

U.S. PATENT DOCUMENTS

2006/0069862 A1\* 3/2006 Kano .............................. 711/114
2007/0283090 A1\* 12/2007 Kaji et al. ...................... 711/114
2008/0263277 A1   10/2008 Matsunami et al.

FOREIGN PATENT DOCUMENTS

JP         2004-295457 A    10/2004
\* cited by examiner

*Primary Examiner* — Charles Rones
*Assistant Examiner* — Fazlul Quader
(74) *Attorney, Agent, or Firm* — Foley & Lardner LLP

(57) ABSTRACT

Decrease in the write speed is prevented even when overwriting the entire file. When a NAS apparatus receives a file size change request from a computer as an access request source for changing the size of a file, the NAS apparatus creates a new file related to the file in a file system with a processing performance that is higher than a file system containing the file as an entity of that file, associates the new file and the foregoing file, deletes the file on the condition that the new file and the file has been associated, and executes data write processing of writing data into the new file on the condition of subsequently receiving a data write request from the access request source for writing data into the file.

13 Claims, 15 Drawing Sheets

FIG.6

| FS ID | DIRECTORY | VOLUME | TYPE |
|---|---|---|---|
| 0001 | /DIRECTORY A | HIGH SPEED VOLUME (31a) | AngelFS |
| 0002 | /DIRECTORY B | LOW SPEED VOLUME (31b) | BeastFS |
| 1000 | /DIRECTORY U | HIERARCHY FILE SYSTEM MANAGEMENT TABLE | VIRTUAL FS |
| 0000 | /(ROOT DIRECTORY) | ROOT FS | AngelFS |

| FS ID | HIERARCHY FS ID | HIERARCHY NUMBER |
|-------|-----------------|------------------|
| 0001  | 1000            | 1                |
| 0002  | 1000            | 2                |

STORAGE APPARATUS AND ITS FILE CONTROL METHOD AND STORAGE SYSTEM

CROSS REFERENCES

This application relates to and claims priority from Japanese Patent Application No. 2009-73435, filed on Mar. 25, 2009, the entire disclosure of which is incorporated herein by reference.

BACKGROUND

The present invention relates to file management technology for efficiently using a file system that is configured from storage volumes of different performances and prices.

Various types of recording media are used in a computer system. For instance, a hard disk device a computer system may be a SATA (Serial AT Attached) drive, a SAS (Serial Attached SCSI) drive, a FC (Fibre Channel) drive or the like.

A SAS drive and an FC drive have an expensive unit price per capacity in comparison to a SATA drive, but are able to process the writing and reading of data at high speed. In recent years, an SSD (Solid State Disk) is being used as a recording media that is faster and more expensive than a hard disk device. These expensive high-speed recording media are suitable in storing data that is updated frequently.

Meanwhile, an inexpensive low-speed drive is suitable for storing data that is hardly updated.

Generally speaking, it is said that the amount of data that is updated frequently is roughly 20% of the total data amount, and storage costs can be reduced by properly using the recording media to be used in accordance with the update frequency of data. As a result of taking note of this fact, known is a hierarchy file management system that automatically migrates files to a suitable drive based on the update frequency (Japanese Patent Laid-Open Publication No. 2004-295457).

SUMMARY

The performance (throughput) of write processing of writing data into a file is known to be based on the performance of the drive in which such file is located. Thus, in a conventional hierarchy file management system, a file is migrated from a high-speed drive to a low-speed drive according to the life cycle of that file. Nevertheless, when performing the processing of overwriting the entire file that was migrated to the low-speed drive, this will be slower than the write processing of writing data into that file before it was migrated. This delay becomes particularly notable when overwriting an entire file of a large size since it contains large amounts of data.

An object of the present invention is to provide a storage apparatus and its file control method and a storage system capable of executing overwrite processing to a file in a file system with a processing performance that is higher than a file system containing that file upon performing the overwrite processing of a file.

In order to achieve the foregoing object, the present invention is characterized in that, upon receiving a file size change request from an access request source, it seeks a real file as an entity of an access target file based on the access target file designated in the file size change request, creates a new file related to the real file in a file system that is different from the file system containing the real file, deletes the real file on the condition that the new file and the access target file have been associated, and executes data write processing (overwrite processing) of writing data into the new file on the condition that a data write request of writing data into the access target file is subsequently received from the access request source.

According to the present invention, it is possible to prevent the decrease in the overwrite processing speed of overwriting the file even upon overwriting the entire file.

DESCRIPTION OF DRAWINGS

FIG. 6 is a configuration diagram explaining a mount management table according to an embodiment of the present invention;

FIG. 7 is a configuration diagram explaining a hierarchy management table according to an embodiment of the present invention;

DETAILED DESCRIPTION

The configuration of a storage system according to the present invention is now explained with reference to the attached drawings. Incidentally, the embodiments explained below are not intended to limit the claimed invention in any way, and the various elements and their combinations explained in the embodiments are not necessarily indispensable as the means for achieving the present invention.

<Outline>

Foremost, the outline of the storage system according to the present invention is explained. The storage system comprises a computer, a storage device, and a file server connected respectively to the computer and the storage device via a communication network. The file server, in response to a file size change request from the computer, seeks a real file as an entity of an access target file based on the access target file designated in the file size change request, creates a new file related to the real file in a file system that is different from the file system containing the real file, deletes the real file on the condition that the new file and the access target file have been associated, and executes data write processing of writing data into the new file on the condition that a data write request of writing data into the access target file is subsequently received from the access request source.

Figure 1:
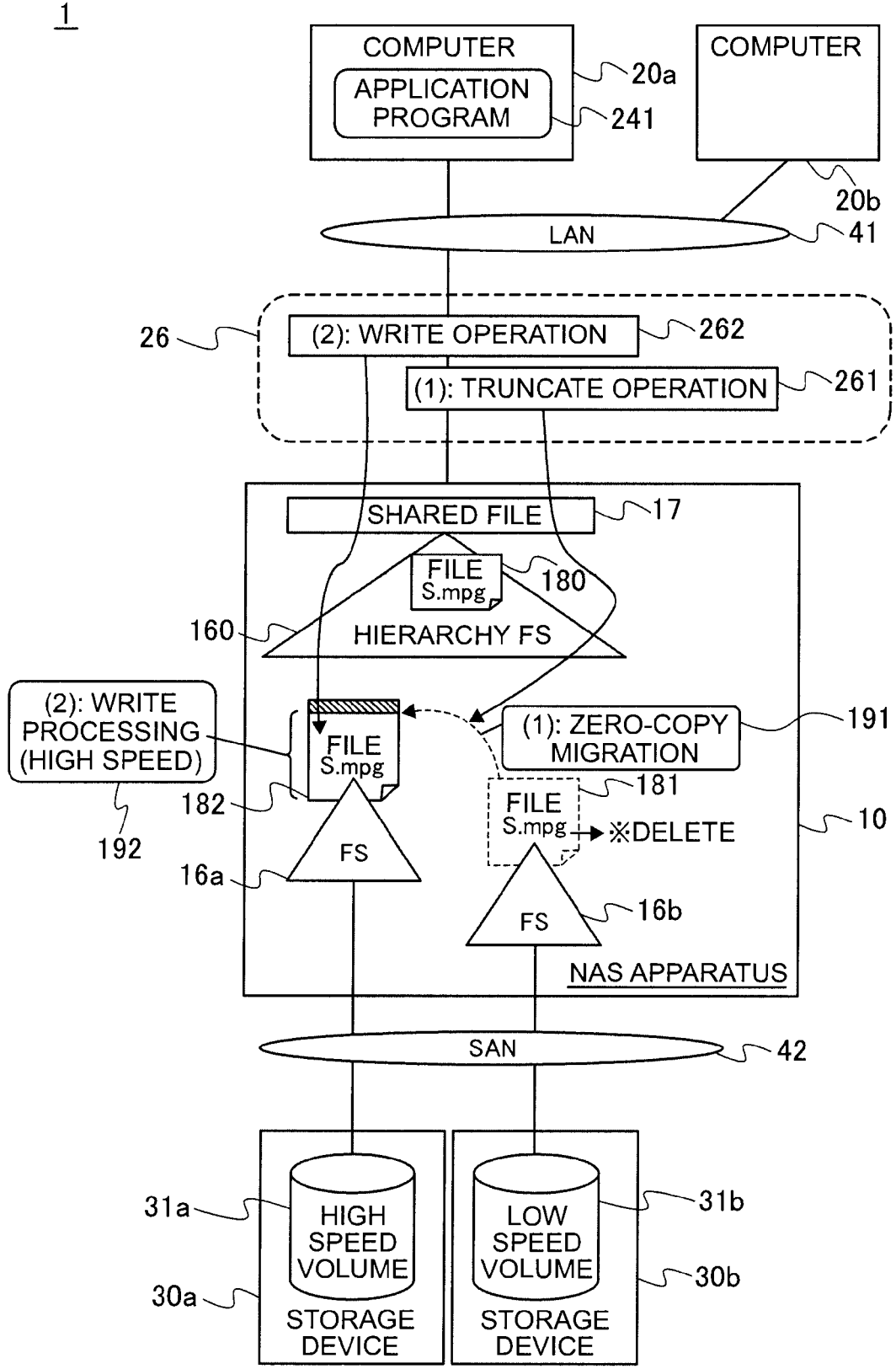
FIG. 1 is a configuration diagram explaining the outline of a storage system according to an embodiment of the present invention.

FIG. 1 is a configuration diagram explaining the outline of the storage system according to the present invention.

The storage system 1 is configured from a NAS (Network Attached Storage) apparatus 10 as a file server, computers 20a, 20b, and storage device 30a, 30b. In addition, the storage system 1 also includes a management computer (not shown) for controlling the storage system 1. The NAS apparatus 10 is connected to the computers 20a and 20b via a communication network such as a LAN (Local Area Network) 41, and connected to the memory devices 30a and 30b via a communication network such as a SAN (Storage Area Network) 42.

The storage device 30a has a volume 31a. The storage device 30b has a volume 31b. The volumes 31a and 31b are used as storage areas for the NAS apparatus 10 to store data. The volume 31a, in comparison to the volume 31b, is configured as a volume that is capable of processing the data reading and data writing at high speed.

For example, if a plurality of volumes are configured by being separated into different groups of processing performance, such as access frequency, as logical storage areas of data, the volume 31a is configured as a volume that is established in a storage area of the storage device 30a and as a volume that belongs to a group (high-order group) with higher access frequency and faster processing speed than the volume 31b, and the volume 31b is configured as a volume that is established in a storage area of the storage device 30b and as a volume that belongs to a group (low-order group) with lower access frequency and slower processing speed than the volume 31a.

The NAS apparatus 10 configures a storage apparatus together with the storage devices 30a and 30b, and includes file systems 16a and 16b containing files directories which are hierarchically established in the volumes 31a and 31b. The file systems 16a and 16b are respectively established in the volume 31a and the volume 31b. The file systems 16a and 16b are respectively integrated and arranged in the NAS apparatus 10 as a virtually hierarchized hierarchy file system 160.

The hierarchy file system 160 is configured so that it is able to access the files and directories stored in the file systems 16a and 16b, for example, by the computer 20a accessing the hierarchy file system 160.

Here, the rules for the hierarchy file system 160 to access the files and directories stored in the file systems 16a and 16b in response to an access request source of an application program or the like existing in the computer 20a are shown below.

(1) The files and directories that are stored in the file system 16a or 16b appear as though they are files and directories that are stored in the hierarchy file system 160.

(2) The path name of the files and directories of (1) above is the same in the hierarchy file system 160. For example, a file with a path name of "dir/file.txt" in the file system 16a can also be accessed under the same path name of "dir/file.txt" in the hierarchy file system 160.

(3) If there are directories with the same path name in the file systems 16a and 16b, all files contained in those directories of the file systems 16a and 16b will appear in those directories in the hierarchy file system 160.

(4) If a read access to a file is made in the hierarchy file system 160, data is read from the file having the same path name of the file system 16a or 16b that is actually storing that file. The same processing is performed during a write access.

The NAS apparatus 10 also has a file sharing 17. The file sharing 17 is a function of enabling the hierarchy file system 160 to be accessed by the computers 20a and 20b. The communication protocol between the file sharing 17 and the computers 20a and 20b, for instance, a file transfer protocol as represented by a NFS (Network File System) protocol, a CIFS (Common Internet File System) protocol, an HTTP (Hypertext Transfer Protocol), an FTP (File Transfer Protocol) or the like may be used.

When the computers 20a and 20b are to access the hierarchy file system 160 via the file sharing 17, the foregoing rules will apply.

Here, a case is explained where an application program 241 running on the computer 20a accesses a file 180 named S.mpg that is stored in the NAS apparatus 10. The file 180 is an access target file of the computer 20a, and, although it appears from the computer 20a to be stored in the hierarchy file system 160, the entity is stored as a file 181 in the file system 16b.

When the computer 20a makes a read/write request to file 180, that request is processed to the file 181 of the file system 16b. Since the file system 16b is established on the volume 31b, the read/write request will be processed at a slower speed than a case where the read/write request is made to the file system 16a that is established on the volume 31a. Nevertheless, if the application program 241 is to overwrite the file 180 (complete rewriting using new data), the present invention is able to avoid the decrease in the processing speed even in cases where the entity of the file 180 exists as the file 181 in the file system 31b.

Specifically, the request to be issued to the NAS apparatus 10 when the application program 241 is to overwrite the file 180 is shown in an overwrite request sequence 26. The overwrite request sequence 26 includes a TRUNCATE operation request 261 and a WRITE operation request 262. The TRUNCATE operation request 261 is a request for changing the file size. When overwriting the file, this also includes the operation code of emptying the file (making the file size 0). The WRITE operation request 262 is a request for writing data into the file.

The NAS apparatus 10 performs the following operation in the overwrite request sequence 261. Consequently, it is possible to prevent the decrease in speed during the overwriting of the file 180.

(1) TRUNCATE Operation Request 261

(1-1) The file sharing 17 receives the TRUNCATE operation request 261 to the file 180.

(1-2) The file sharing 17 requests the file size truncation of the file 180 to the hierarchy file system 160.

(1-3) The hierarchy file system 160 receives the file size truncation request, creates a file 182 with the same path name as the file 180 and having a size of 0 in the file system 16a, and changes the entity of the file 180 from the file 181 to the file 182 (zero copy migration 191). As the association of the file 182 and the file 180, association that the entity of the file 180 is the file 182 is performed.

(1-4) The hierarchy file system 160 deletes the file 181 of the file system 16a.

At this point in time, the entity of the file 180 has been virtually migrated from the low-speed file system 16b to the high-speed file system 16a. However, since the file 180 still exists in the hierarchy file system 160 as the access target file of the application program 241, the application program 241 is unable to recognize the migration of the entity of the file 180.

(2) WRITE Operation Request 262

(2-1) The file sharing 17 receives the WRITE operation request 262 to the file 180.

(2-2) The file sharing 17 requests the data writing into the file 180 to the hierarchy file system 160.

(2-3) The hierarchy file system 160 receives the data write request to the file 180, and writes data into the file 182 as the entity of the file 180 (high-speed WRITE processing 192).

At this point in time, since the file 182 exists in the file system 16a established on the volume 31a, there will be no delay in the writing of data.

As described above, when the NAS apparatus 10 receives a file size change request from the computer 20a as a file server, it extracts the access target file 180 designated in the file size change request from a file group belonging to the hierarchy file system 160, extracts a first file system 16b among a plurality of file systems belonging to the hierarchy file system 160 to which the real file 181 as an entity of the access target file 180 belongs and a high-speed second file system 16a to become a virtual migration destination of the real file 181, creates a new file 182 in the extracted file system 16a, deletes the real file 181 on the condition that the new file 182 and the access target file 180 have been associated, and executes data write processing of writing data into the new file 182 on the condition that a data write request of writing data into the access target file 180 is subsequently received from the access request source.

In other words, when the application program 241 is to overwrite file 180, even if the entity of the file 180 exists as the file 181 in the file system 31b, it is possible to virtually migrate the entity of the file 180 from the low-speed file system 16b to the high-speed file system 16a in response to the overwrite request sequence 26, and, upon subsequently receiving the data write request of writing data into the file 180 in the WRITE operation request 262, the decrease in the write speed can be prevented even when overwriting the entire file 180 by writing data into the file 182 as the entity of the file 180.

Embodiments

An embodiment of the present invention is now explained with reference to the attached drawings.

<NAS Apparatus>

Figure 2:
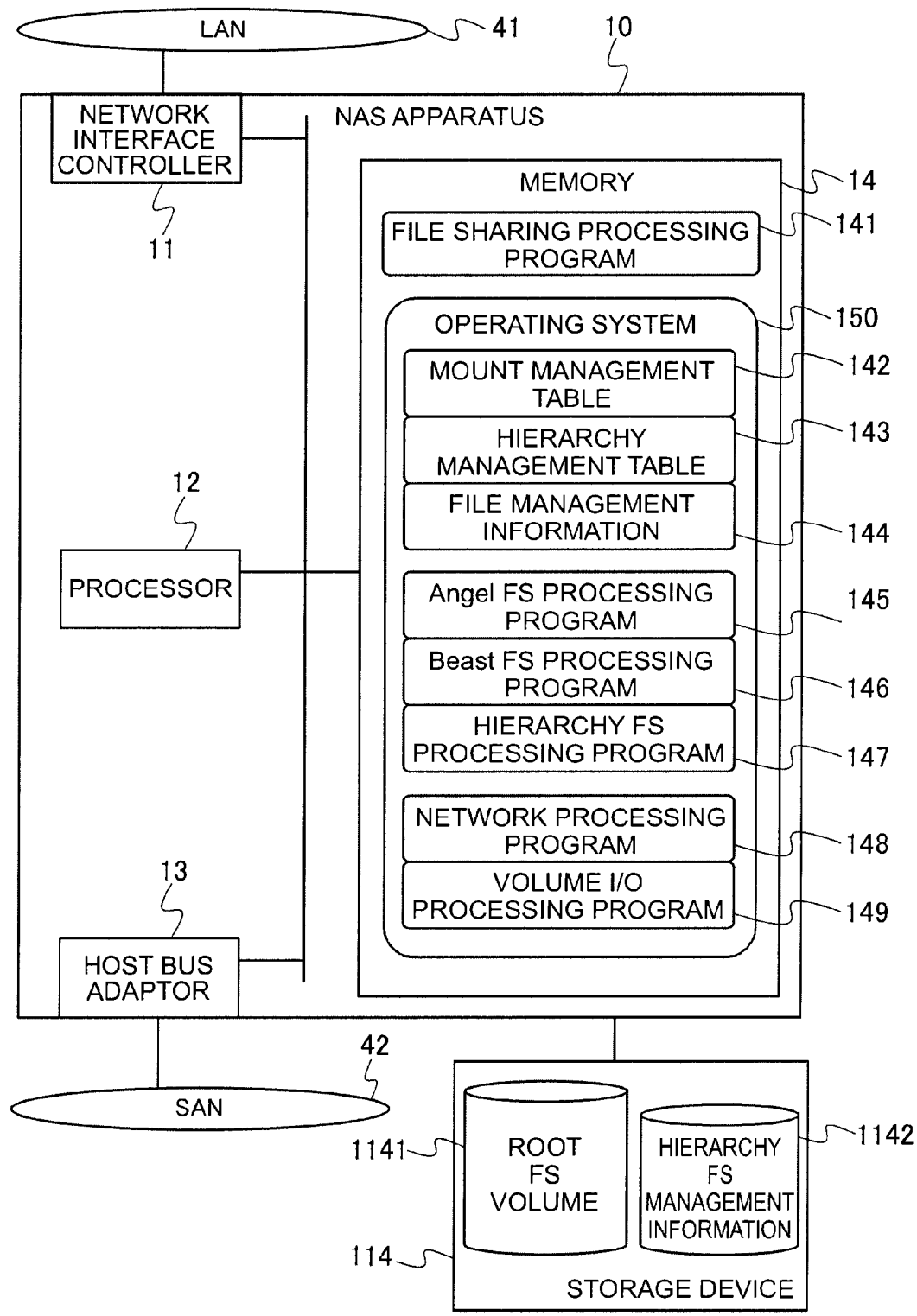
FIG. 2 is a configuration diagram explaining a NAS apparatus according to an embodiment of the present invention.

FIG. 2 is a diagram explaining the NAS apparatus 10 according to an embodiment of the present invention.

The NAS apparatus 10 includes a network interface controller 11, a processor 12, a host bus adapter 13, a storage device 114, and a memory 14. The network interface controller 11 mediates the exchange of data with the computers 20a, 20b via the LAN 41. The host bus adapter 13 mediates the exchange of data with the storage devices 30a, 30b via the SAN 42.

The processor 12 is configured as a controller for executing various types of processing by using the programs and data stored in the memory 14; for instance, the processing of extracting the access target file designated in the file size change request from the memory 14 upon receiving a file size change request from an access request source such as the computer 20a.

The memory 14 stores programs and data. In this embodiment, the memory 14 stores a file sharing processing program 141 for executing processing concerning the file sharing 17, and an operating system 150 for executing I/O processing and the like. The operating system 150 includes a mount management table 142, a hierarchy management table 143, and file management information 144, and as programs, includes an Angel FS processing program 145 and a Beast FS processing program 146 for executing processing concerning the file systems 16a and 16b, a hierarchy file system processing program 147, a network processing program 148, and a volume I/O processing program 149.

The Angel FS is the name of the type of the file system 16a. The Beast FS is the name of the type of the file system 16b.

The operating system 150 additionally includes a hierarchy file system processing program 147 for executing processing concerning the hierarchy file system 160, a network processing program 148 for executing processing concerning the network, and a volume I/O processing program 149 for executing I/O processing to the volumes 31a and 31b.

The file sharing processing program 141 uses the network processing program 148 to process the communication with the computers 20a and 20b.

The Angel FS processing program 145 and the Beast FS processing program 146 use the volume I/O processing program 149 to perform processing of storing and reading data into or from the file system 16a or 16b.

The storage device 114 comprises root file system volume 1141 for storing the root file system 161, and a hierarchy file system volume 1142 for storing the hierarchy file system management information 1143.

The root file system 161 stores various programs to be run on the NAS apparatus 10. The hierarchy file system management information 1143 will be explained later.

The hierarchy file system 1143 may also be stored in storage devices other than the storage device 114 such as in the storage device 30a or 30b.

<Computer>

Figure 3:
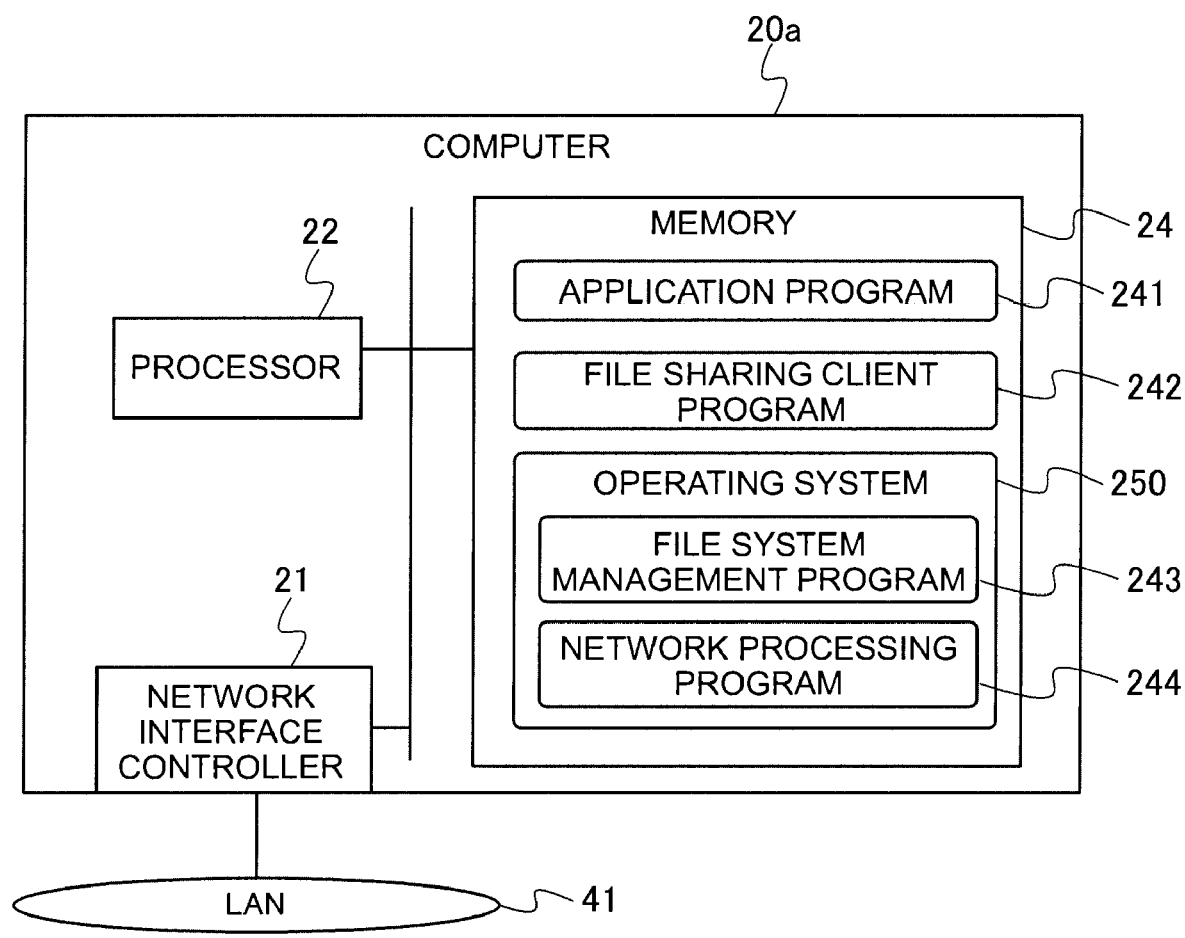
FIG. 3 is a configuration diagram explaining a computer according to an embodiment of the present invention.

FIG. 3 is a configuration diagram explaining the computer 20a according to an embodiment of the present invention. In this embodiment, the computer 20b is configured the same as the computer 20a, and the explanation of the computer 20b is thereby omitted.

The computer 20a includes a network interface controller 21, a processor 22, and a memory 24.

The network interface controller 21 mediates the exchange of data with the NAS apparatus 10 via the LAN 41.

The processor 22 executes various types of processing using the programs and data stored in the memory 24.

The memory 24 stores programs and data. In this embodiment, the memory 24 stores an application program 241, a file sharing client program 242, and an operating system 250. The operating system 250 additionally includes a file system processing program 243, and a network processing program 244.

The application program 241 uses the data of files stored in the NAS apparatus 10 to perform prescribed processing. The file sharing client program 242 and the file system processing program 243 mutually cooperate and perform processing such as the reading and writing of files stored in the NAS apparatus 10 according a request from the application program 241. The file sharing client program 242 uses the network processing program 244 to process data communication with the NAS apparatus 10.

<Mount>

Figure 4:
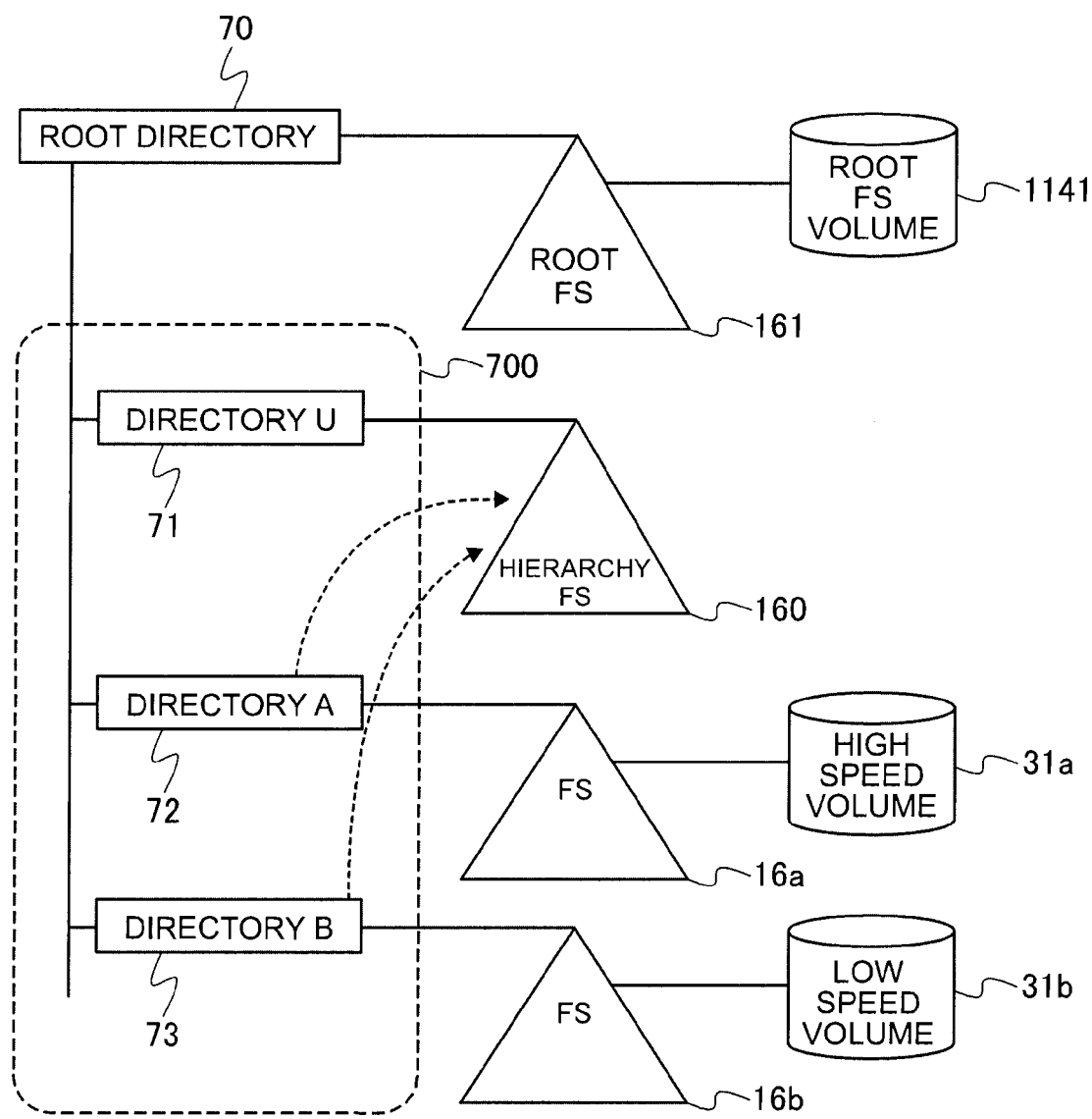
FIG. 4 is a configuration diagram explaining the concept of mounting a file system in a NAS apparatus according to an embodiment of the present invention.

FIG. 4 is a diagram explaining the concept of mounting the file system in the NAS apparatus 10 according to an embodiment of the present invention.

Mounting of a file system refers to the operation of enabling a computer (NAS apparatus 10 in this case) to use a file system that is configured on the volume.

The NAS apparatus 10 has one directory structure (inclusive relation between directories and inclusive relation between directory and file). Based on the mount operation, a file system can be connected to any directory contained in the directory structure of the NAS apparatus 10. When a file system is connected to the directory, the files and directories stored in the file system appear below the destination directory and become accessible.

The NAS apparatus 10 defines a root directory 70 as the base directory of the directory structure. The root directory 70 is a virtual directory provided by a file system management program (not shown) of the operating system 150.

The root directory 70 is mounted with a root file system 161. The root file system 161 is established on the storage device 114. The root file system 161 stores a root file system directory structure 700.

In the subsequent explanation, the alphanumeric characters that follow the wording of a directory or a file show the name of that directory or file.

The root file system directory structure 700 of the root directory 70 includes, at the top level, the directories of a directory (U) 71, a directory (A) 72, and a directory (B) 73. The root file system directory structure 700 includes other directories and files that are not shown. The respective directors of the directory (U) 71, the directory (A) 72, and the directory (B) 73 can be accessed as the child directory of the root directory 70.

The directory (A) 72 is mounted with the file system 16a that is configured on the volume 31a. The directory (B) 73 is mounted with the file system 16b that is configured on the volume 31b.

The directory (U) 71 is mounted with the hierarchy file system 160. The hierarchy file system 160, as explained later, is set to integrate the file systems 16a and 16b. Consequently, the directory (U) 71 is able to access the files stored in the file systems 16a and 16b which are mounted on the directory (A) 72 and the directory (B) 73 according to the foregoing rules.

<Appearance of Files>

Figure 5:
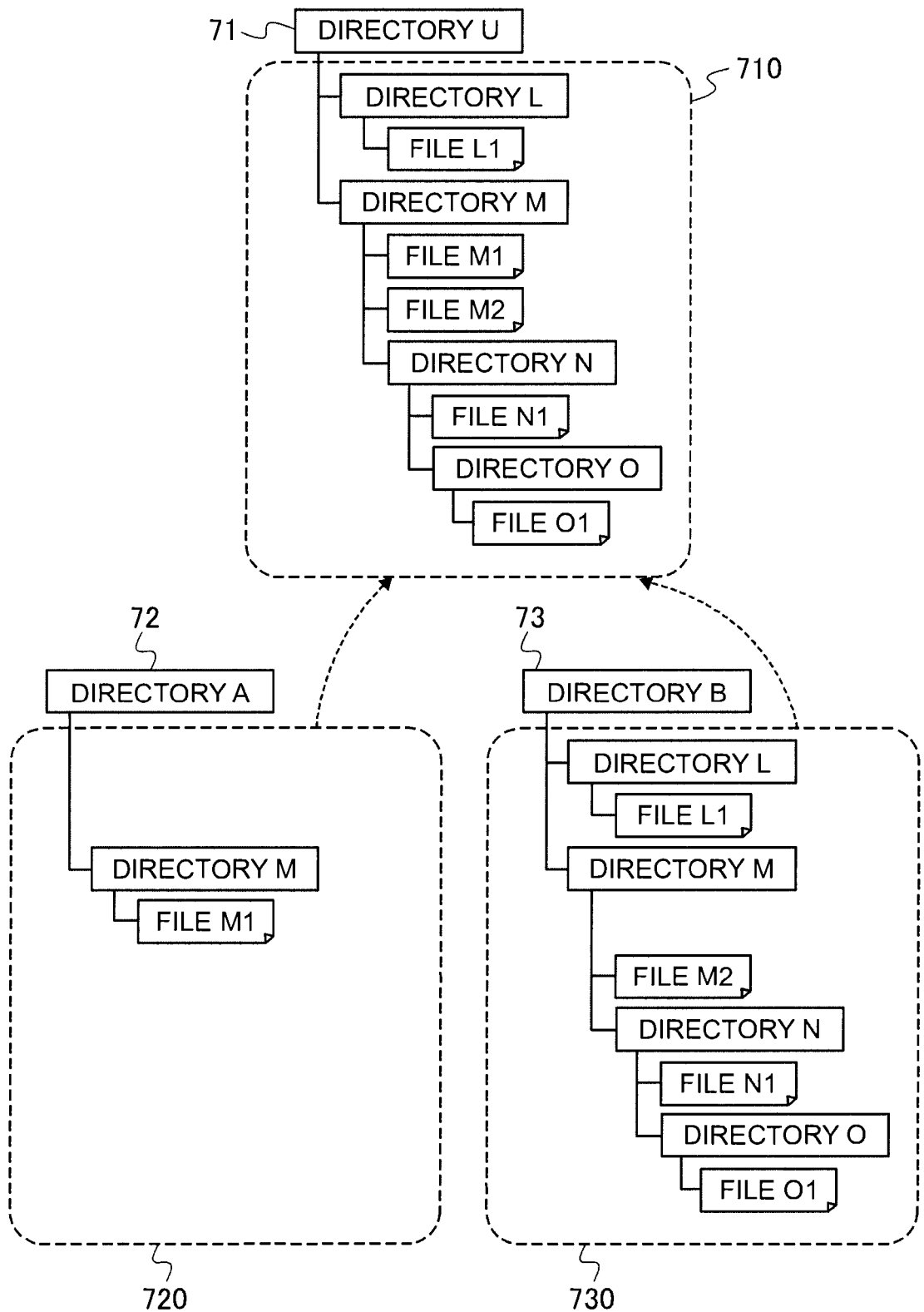
FIG. 5 is a configuration diagram explaining the configuration of a hierarchy file system and a file system, and the relationship between the two according to an embodiment of the present invention.

FIG. 5 is a configuration diagram explaining the configuration of the hierarchy file system 160, the file system 16a, and the file system 16b, and the relationship between the respective files.

The file system 16a stores information concerning the directory structure 720. The directory structure 720 includes a directory M and a file M1. The directory M is a top-level directory of the file system 16a. The file system 16a is mounted on the directory (A) 72 of the root file system 161, and the directory M can be accessed as a directory that is immediately below the directory (A) 72. The file M1 is a file that is immediately below the directory M.

The file system 16b stores information concerning the directory structure 730. The directory structure 730 includes a directory L, a file L1, a directory M, a file M2, a directory N, a file N1, a directory O, and a file O1.

The directory L and the directory M are top-level directories in the low-speed file system 16b. Since the file system 16b is mounted on the directory (B) 73 of the root file system 161, the directory L and the directory M can be accessed as directories that are immediately below the directory (B) 73.

The directory N is a directory that is immediately below the directory M. The directory O is a directory that is immediately below the directory N.

The file L1 is a file that is immediately below the directory L1. The file M2 is a file that is immediately below the directory M. The file N1 is a file that is immediately below the directory N. The file O1 is a file that is immediately below the directory O.

The hierarchy file system 160 virtually stores information concerning the directory structure 710. The directory structure 710 includes a directory L, a directory M, a directory N, a directory O, a file L1, a file M1, a file M2, a file N1, and a file O1.

As explained above, the entities of these files and directories exist in the file system 16a and the file system 16b, and appear in the hierarchy file system 160 under the same path name.

The entity of the directory M exists in the file system 16a and the file system 16b. Thus, the directory M includes a file M1, a file M2, and a directory N in the directory structure 710 of the hierarchy file system 160.

<Mount Management Table>

FIG. 6 is a configuration diagram explaining the mount management table 142 according to an embodiment of the present invention.

The mount management table 142 is information for managing the directories of the mount destination for each file system.

The mount management table 142 stores records including an FS ID field 1421, a directory field 1422, a volume field 1423 and a file system type field 1424. Based on these record, the file system and its mount destination directory are associated.

The FS ID field 1421 stores information (FS ID) for identifying the file system. The directory field 1422 stores the path name of the directory to which the file system is to be mounted. The volume field 1423 stores information for identifying the volume. The file system type field 1424 stores the type of the file system.

For example, the first record of the mount management table 142 shown in FIG. 6 records information concerning the file system 16a. In this record, the FS ID fields 1421 is "0001," the directory field 1422 is "/directory (A) 72," the volume field 1423 is "volume 31a," and the file system type field 1424 is "Angel FS."

The third record records information concerning the hierarchy file system 160. In this record, the volume field 1423 stores "hierarchy file system management information 1143." This shows that the directory structure of the hierarchy file system 160 is stored in the hierarchy file system management information 1143 described later.

<Hierarchy Management Table>

FIG. 7 is a diagram explaining the hierarchy management table 143 according to an embodiment of the present invention.

Upon configuring the hierarchy management table 143:

(a) the hierarchy number is allocated in ascending order from the file system with the highest processing performance;

(b) the high-order file system is defined in the ascending order of the hierarchy number; and (c) in the case of (a) above, one of the following methods is employed:

c-1: the NAS administrator inputs the hierarchy number into the NAS;

c-2: the NAS apparatus automatically allocates the hierarchy number by measuring the performance of the respective file systems; or c-3: c-1, c-2 are combined.

The hierarchy management table 143 is information recording the relationship between the hierarchy file system 160 and a file system forming the hierarchy file systems 16a, 16b thereof.

The hierarchy management table 143 stores records including an FS ID field 1431, a hierarchy management FS ID field 1432, and a hierarchy number field 1433.

For example, the first record of the hierarchy management table 143 shown in FIG. 7 shows that the file system 16a is the first hierarchy of the hierarchy file system 160. In this record, the FS ID field 1431 is FS ID "0001" of the high-speed file system 16a, the hierarchy management FS ID field 1432 is FS ID "1000" of the hierarchy file system 160, and the hierarchy number field 1433 is "1."

<File Management Information>

Figure 8:
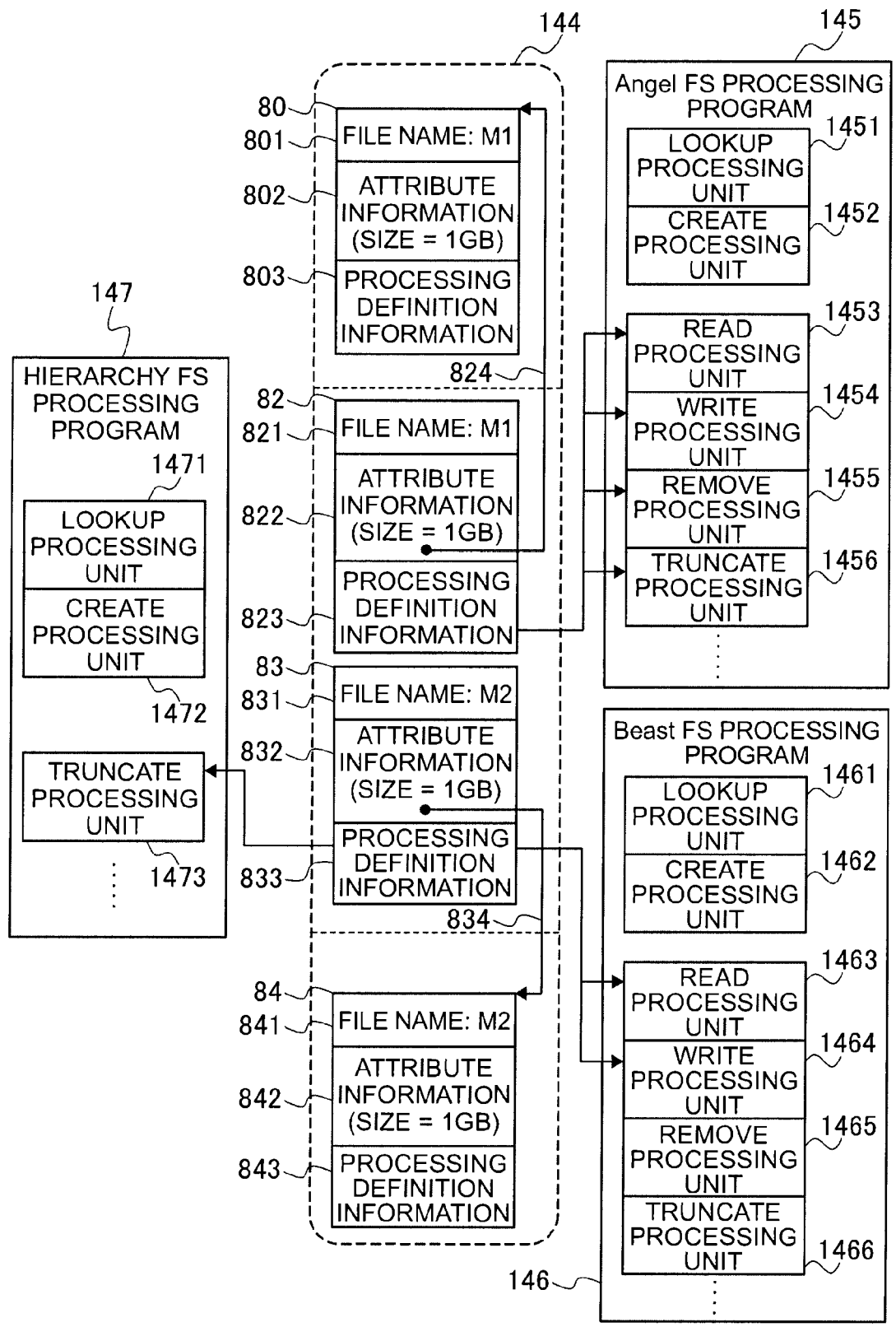
FIG. 8 is a configuration diagram explaining file management information according to an embodiment of the present invention.

FIG. 8 is a configuration diagram explaining the file management information according to an embodiment of the present invention.

The file management information 144 includes information (file management structure) of the respective files being managed by the NAS apparatus 10, but FIG. 8 is only illustrating the file management structures 80, 82, 83, 84.

The file management structure 80 is a file management structure corresponding to the file M1 that is stored in the file system 16a.

The file management structures 82 and 83 are the file management structures corresponding to the files M1 and M2 that are virtually stored in the hierarchy file system 160, respectively.

The file management structure 84 is a file management structure corresponding to the file M2 that is stored in the file system 16b.

Each file management structure includes a file name field 801, 821, 831, 841, an attribute information field 802, 822, 832, 842, and a processing definition information field 803, 823, 833, 843. The file name field stores the file name of the corresponding file. The attribute field stores the attribute information of the corresponding file. Attribute information is metadata such as the file access right, last access time, and file size. Each attribute information field 802, 822, 832, 842 of the file management structure 80, 82, 83, 84 contains information showing that the size of each corresponding file is 1 GB.

The processing definition information field 803, 823, 833, 843 stores information that sets forth procedures for performing the various types of processing to the file. The processing definition information field 823 of the file management structure 82 sets forth that the various types of processing of the file M in the hierarchy file system 160 are to be executed by utilizing a read processing unit 1453, a write processing unit 1454, a remove processing unit 1455, a truncate processing unit 1456 and other processing units (not shown) of the Angel FS processing program 145.

The processing definition information field 833 of the file management structure 83 sets forth that the various types of processing of the file M2 in the hierarchy file system 160 are to be executed by utilizing a read processing unit 1463, a write processing unit 1464, a remove processing unit 1465 and other processing units (not shown) of the Beast FS processing program 146, and a truncate processing unit 1473 of the hierarchy file system processing program 147.

The processing definition information field 803 of the file management structure 80 sets forth that the various processing units of the Angel FS processing program 145 are utilized for performing the various types of processing of the file M1 in the file system 16a (not shown to avoid complication of diagram).

The processing definition information field 843 of the file management structure 84 sets forth that the various processing units of the Beast FS processing program 146 are utilized for performing the various types of processing of the file M2 in the file system 16b (not shown to avoid complication of diagram).

The attribute information 822 of the file management structure 82 additionally stores link information 824 showing that the entity of the file M1 of the hierarchy file system 160 is the file M1 of the file system 16a. Similarly, the attribute information 832 of the file management structure 83 stores link information 834 showing that the entity of the file M2 of the hierarchy file system 160 is the file M2 of the file system 16b.

<Processing Unit of File System Program>

The various processing units of the file system program are now explained.

The type of the file system 16a is an Angel FS, and the various types of processing concerning the file system 16a and its files and directories are executed by the various processing units of the Angel FS processing program 145. In addition, the type of the file system 16b is a Beast FS, and the various types of processing concerning the file system 16b and its files and directories are executed by the various processing units of the Beast FS processing program 146.

The read processing units 1453, 1463 perform processing of returning data to the access request source in accordance with a data read request of reading data stored in the file that is sent from the access request source. In this embodiment, an access request source is the file sharing processing program 141 or another program (not shown) that is running on the NAS apparatus 10. The same shall apply to the access request source explained below.

The write processing units 1454, 1464 perform processing of writing data into a file in accordance with a data write request of writing data into the file that is sent from the access request source. The access request source delivers, together with the data write request, the data to be written to the write processing unit.

The remove processing units 1455, 1456 perform processing of deleting a file in accordance with a file deletion request sent from the access request source.

The truncate processing units 1456, 1466, 1473 perform processing of changing the file size in accordance with a file truncation request sent from the access request source. The access request source designates the intended size together with the file truncation request. If the designated size is smaller than the file size, data of the portion that is greater than the designated size is discarded from the top of the file. If the designated size is larger than the file size, the file is expanded with incremental data as 0. Here, mounting may be performed without allocating a storage area for the incremental data.

However, as described later, the truncate processing unit 1473 of the hierarchy file system management program 147 additionally performs special processing to the files on the low-speed file system 16a.

The lookup processing units 1451, 1461, 1471 perform processing of returning the list of files and directories contained in the designated directory in accordance with a directory content list acquisition request sent from the access request source.

The create processing units 1452, 1462, 1472 perform processing of creating the designated file in accordance with a file creation request sent from the access request source. In the case of the create processing unit 1472 of the hierarchy file system 160, a file is created in one of the file systems (file system 16a or 16b) configuring the hierarchy. The file system to create the file will follow the rules set by the user (administrator) of the NAS apparatus 10 in advance.

<Hierarchy File System Management Information>

Figure 9:
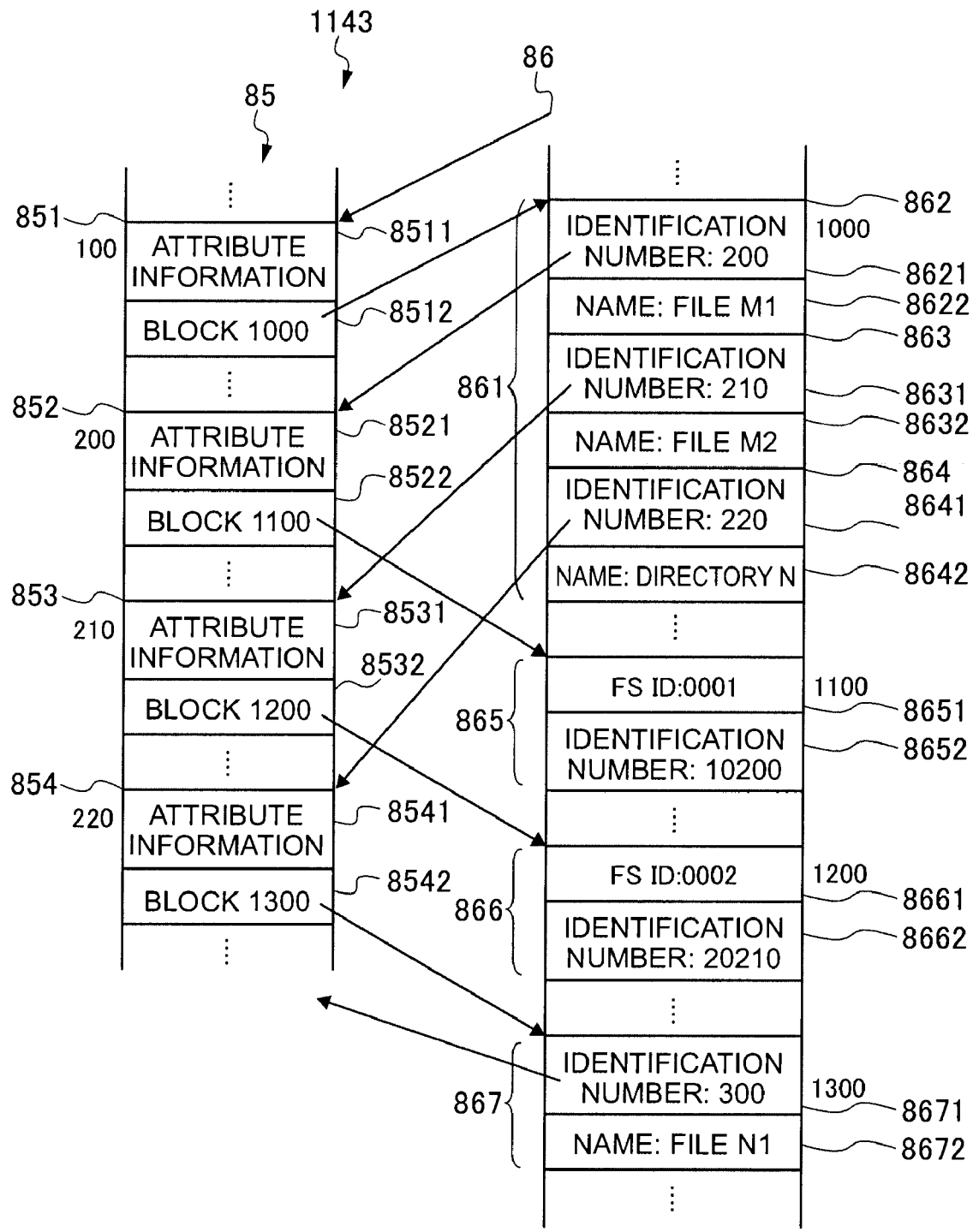
FIG. 9 is a configuration diagram explaining hierarchy file system management information according to an embodiment of the present invention.

FIG. 9 is a diagram explaining the hierarchy file system management information 1143 according to an embodiment of the present invention.

The hierarchy file system management information 1143 records information concerning all files that are virtually included in the hierarchy file system 160. FIG. 9 shows an excerpt of only those related to the directory M, the file M1, the file M2, and the directory N within the files and directories included in the hierarchy file system 160.

The hierarchy file system management information 1143 is configured from a first management area 85 and a second management area 86.

The first management area 85 stores the data structure corresponding to the respective files and directories. The data structure 851 corresponds to the directory M. The data structure 852 corresponds to the file M1. The data structure 853 corresponds to the file M2. The data structure 854 corresponds to the directory N.

In the hierarchy file system 160, the file system 16a, and the file system 16b, an identification number is allocated to all files and directories. In the first management area 85, let it be assumed that the size of each data structure is the same. In order to acquire the data structure corresponding to the intended file or directory, the storage address is specified based on the identification number allocated to the files and directories. For example, an identification number 100 is allocated to the directory M in the hierarchy file system 160, and it is possible to specify that the data structure in the first management area 85 is the data structure 851 that is in the $100^{th}$ position from the top.

Each data structure stores at least an attribute information field and a block address field. The attribute information field stores the metadata of the corresponding file or directory. The block address field stores the block address in the second management area 86 storing the additional information of the corresponding file or directory.

The block address field 8512 of the corresponding data structure 851 records the block address 1000 of the second management area 86 regarding the directory M in the hierarchy file system 160. The block address 1000 of the second management area 86 records the additional information 861 of the directory M.

The additional information 861 of the directory M stores the information (directory entry) of the files and directories contained in the directory M in the hierarchy file system 160. The additional information 861 includes three directory entries 862, 863, 864. As described above, in the hierarchy file system 160, the directory M contains the file M1, the file M2, and the directory N, and the directory entry 862 corresponds to the file M1, the directory entry 863 corresponds to the file M2, and the directory 864 corresponds to the directory N, respectively.

Each directory entry has an identification number field and a name field. The identification number field stores the identification number of the corresponding file or directory. The name field stores the name of the corresponding file or directory.

For example, the name field 8622 of the directory entry 862 records the name of the file M1, and the identification number field records the identification number "200" in the hierarchy file system 160.

In the first management area 85, the data structure 852 corresponding to the identification number 200 stores information of the file M1. The additional information 865 of the file M1 stores the block address 1100 of the second management area 86. The block address 1100 of the second management area 86 stores the additional information 865.

The additional information 865 includes an FS ID field 8651 for storing an FS ID of the file system storing the entity file of the file M1, and an identification number field 8652 of the entity file of the file M1. The FS ID field 8651 stores "0001" as the FS ID of the file system 16a storing the entity of the file M1. The identification number field 8652 stores "10200" as the identification number in the file system 16a of the file M1.

Similarly, the data structure in the first management area 85 corresponding to the file M2 is the data structure 853, and the additional information in the second management area 86 is the additional information 866. These store, as information, the fact that the entity of the file M2 is located in the file system 16b and that the identification number thereof is 20210.

In addition, the data structure in the first management area 85 of the directory N is the data structure 854, and the additional information in the second management area 86 is the additional information 866. These store, as information the fact that the directory N includes the file N1, and that the identification number in the hierarchy file system of the file N1 is 300.

The top area of the first management area 85 of the hierarchy file system 160 includes management data of the hierarchy file system 160 (not shown), and the identifying information of the directory M can be specified by referred to such management data.

The hierarchy file system management information 1143 is established as needed by scanning the file systems 16a and 16b configuring the hierarchy file system 160. Moreover, the hierarchy file system management information 1143 is changed as needed based on various operations such as the creation, deletion and migration of files and directories to and from the hierarchy file system 160.

<File List Acquisition Processing>

Figure 10:
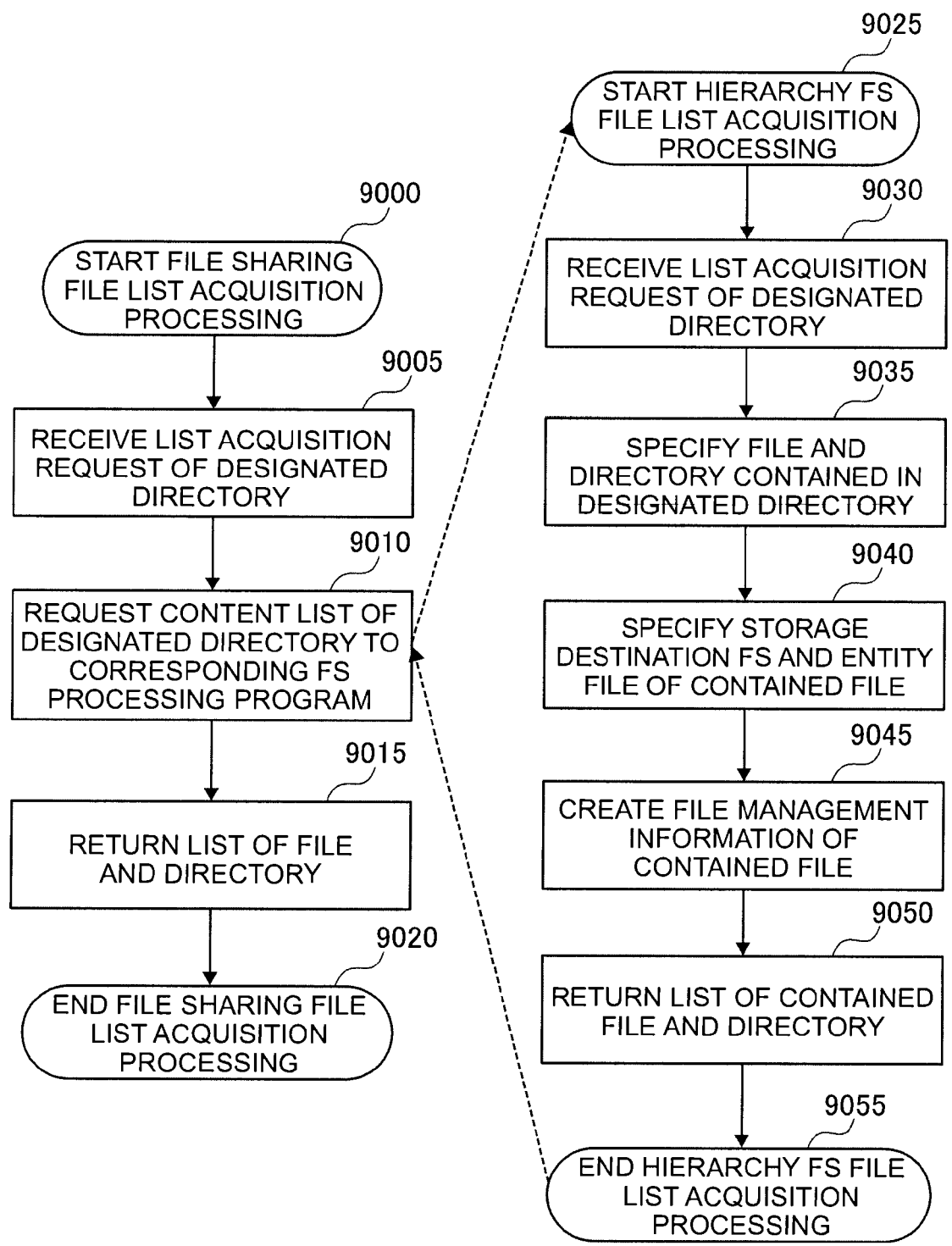
FIG. 10 is a flowchart explaining file list acquisition processing of a NAS apparatus according to an embodiment of the present invention.

FIG. 10 is a flowchart explaining the file list acquisition processing 90 of the NAS apparatus 10 according to an embodiment of the present invention.

The file list acquisition processing 90 is processing of returning a list of files and directories to the directory of the file system that is being shared by the file sharing 17 in accordance with a request from the computer 20a or 20b. The computers 20a and 20b may acquire a list of subordinate directories and files of the intended directory.

The flow of the file list acquisition processing is now explained with reference to FIG. 10 taking an example where the computer 20a requests a list of the subordinate files and directories to the directory M of the hierarchy file system 160.

The processing from processing steps 9000 to 9020 is the processing to be executed by the file sharing processing program 141. The processing from processing steps 9025 to 9055 is the processing to be executed by the lookup processing unit 1471 of the hierarchy file system processing program 147.

At step 9005, the file sharing processing program 141 receives the path name of the directory M or the identifying information capable of specifying the path name from the computer 20a as the access request source.

At step 9010, the file sharing processing program 141 determines that the requested directory M exists in the hierarchy file system 160, and requests a list of files and directories contained in the directory M to the hierarchy file system processing program 147.

The hierarchy file system processing program 147 receives the request from the file sharing processing program 141, and starts the processing from step 9025.

At step 9030, the hierarchy file system processing program 147 receives the path name of the directory M or the identifying information capable of specifying the path name from the file sharing processing program 141.

At step 9035, the hierarchy file system processing program 147 refers to the hierarchy file system management information 1143 and specifies that the directory M contains the file M1 and the file M2 and the directory N.

At step 9040, the hierarchy file system processing program 147 refers to the hierarchy file system management information 1143, and specifies that the entity of the file M1 is the file of identification number 10200 of the file system 16a, and that the entity of the file M2 is the file of identification number 20210 of the file system 16b.

At step 9045, the hierarchy file system processing program 147 creates the file management structures 82 and 83 of the file management information 144 based on the processing results at step 9035 and step 9040, and sets the values according to the contents explained with reference to FIG. 8. Incidentally, the file management structures 80 and 84 are created respectively by the Angel FS processing program 145 and the Beast FS processing program 146 according to the information stored in the file system 16a and the file system 16b.

At step 9050, the hierarchy file system processing program 147 creates a list of the file M1, the file M2, and the directory N, returns the list to the file sharing processing program 141, and then ends this processing (step 9055).

The file sharing processing program 141, at step 9015, returns the list of files and directories obtained with the file sharing processing program 141 to the computer 20a of the access request source, and then ends this processing (step 9020).

<File Read Processing>

Figure 11:
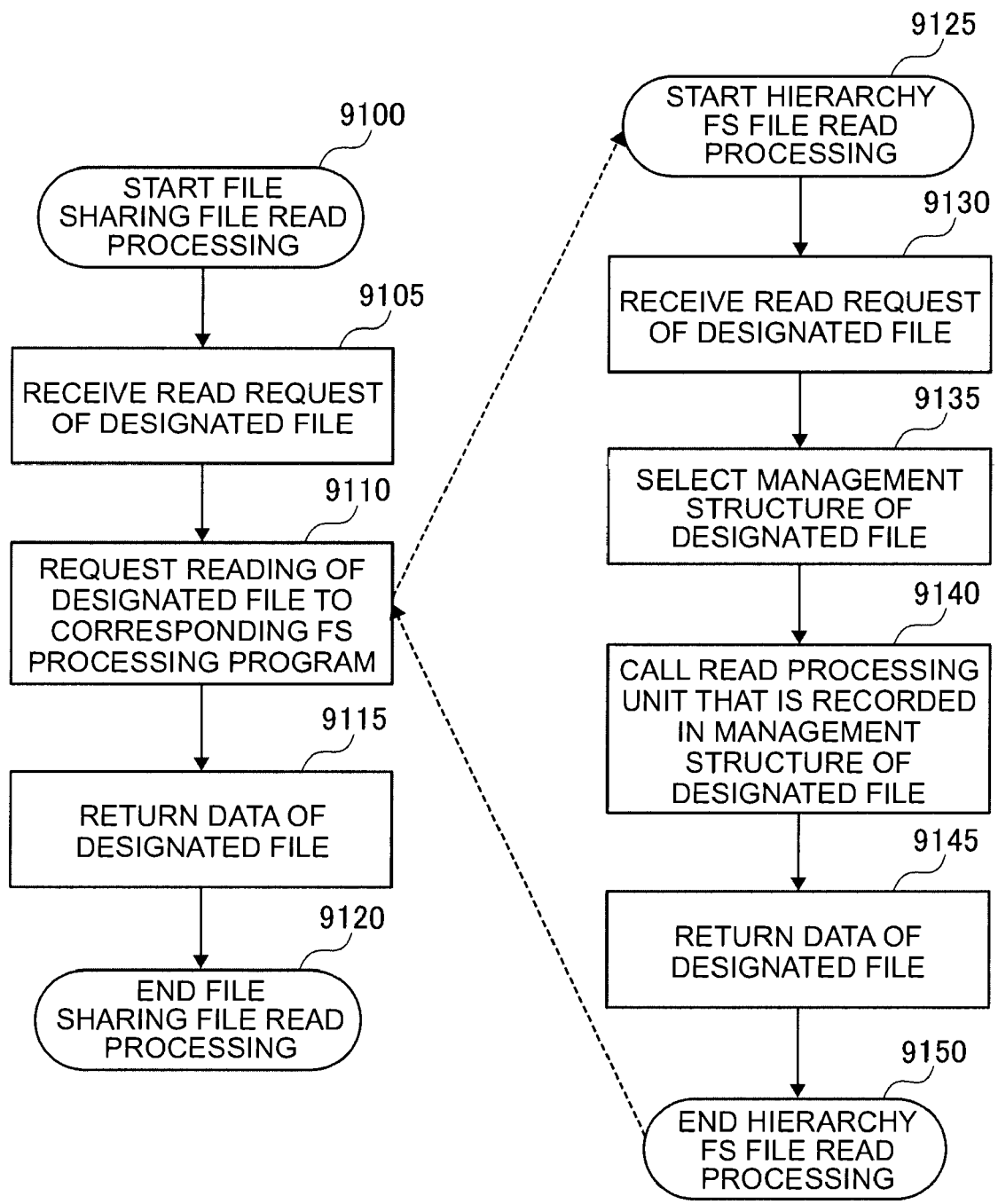
FIG. 11 is a flowchart explaining file read processing of a NAS apparatus according to an embodiment of the present invention.

FIG. 11 is a flowchart explaining the file read processing 91 of the NAS apparatus 10 according to an embodiment of the present invention.

The file read processing 91 is processing of returning data stored in the files of the file system that is being shared by the file sharing 17 in accordance with a request from the computer 20a or 20b. The computers 20a and 20b are able to request the data of the intended file.

The flow of the file read processing 91 is now explained taking an example where the computer 20a requests the data of the file M2 of the hierarchy file system 160. The computer 20a confirms the existence of the file M2 based on the file list acquisition processing explained above.

Processing steps 9100 to 9120 are executed by the file sharing processing program 141. Processing steps 9125 to 9150 are executed by the hierarchy file system processing program 147.

At step 9100, the file sharing processing program 141 receives a request from the computer 20a and starts the processing.

At step 9105, the file sharing processing program receives a read request of the file M from the computer 20a.

At step 9110, the file sharing processing program 141 recognizes that the file M2 is a file of the hierarchy file system 160, and requests the reading of the file M2 to the hierarchy file system processing program 147.

The hierarchy file system processing program 147 receives a request from the file sharing processing program 141, and starts the processing from step 9125.

At step 9130, the hierarchy file system processing program 147 receives a read request of the file M2 from the file sharing processing program 141.

At step 9135, the hierarchy file system processing program 147 selects the file management structure 83 of the file M2 contained in the file management information 144 as the processing target.

At step 9140, the hierarchy file system processing program 147 refers to the processing definition information 833 of the file management structure 83 of the file M2, and calls the read processing unit 1463 of the Beast FS processing program 146 that is recorded in the processing definition information 833.

The read processing unit 1463 of the Beast FS processing program 146 reads the data from the file M2 of the file system 16b and returns the data.

At step 9145, the hierarchy file system processing program 147 returns the data and then ends this processing (step 9150).

The file sharing processing program 141, at step 9115, returns to the computer 20a the data that was returned from the hierarchy file system processing program 147, and then ends this processing (step 9120).

<File Size Truncate Processing>

Figure 12:
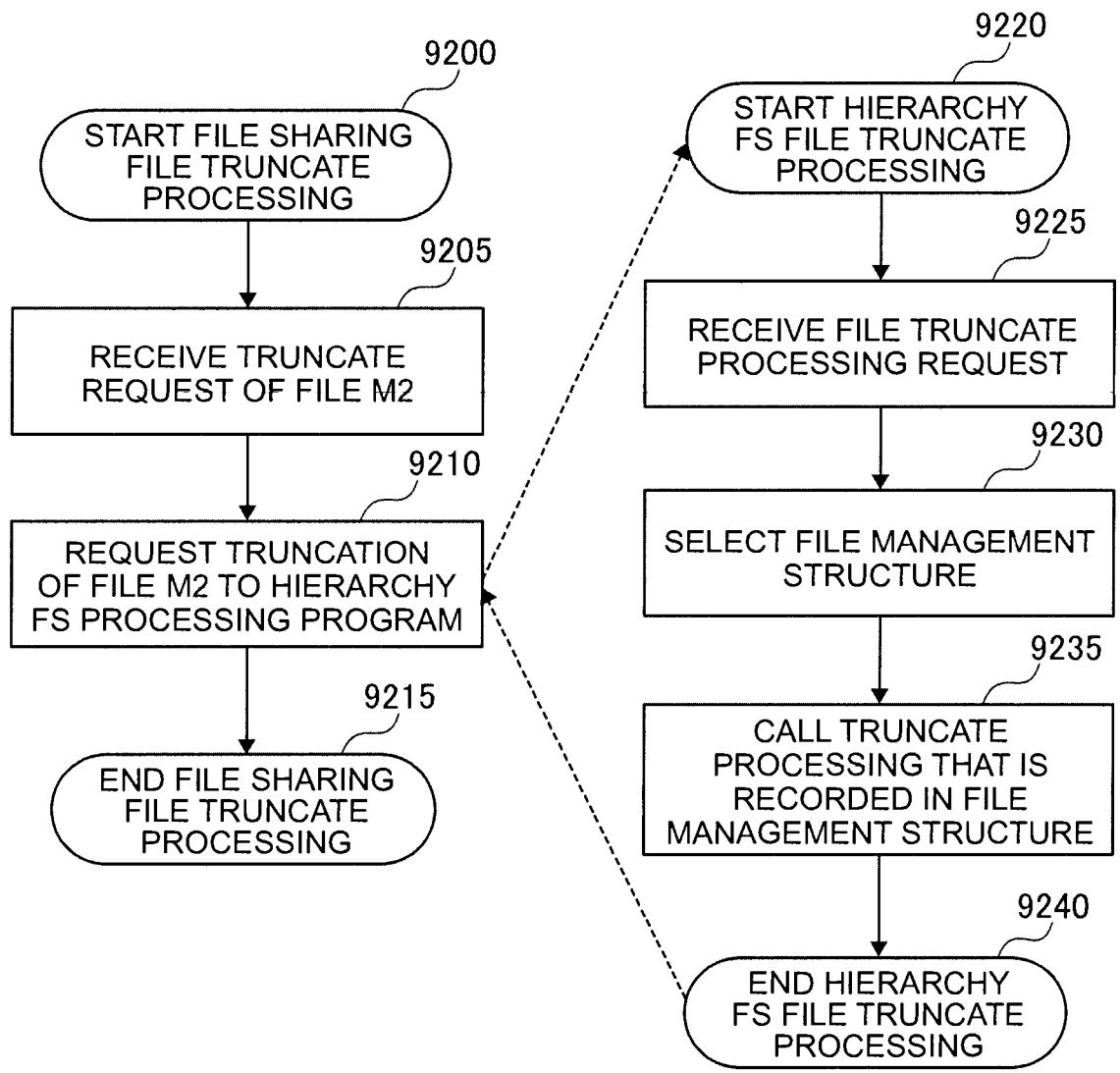
FIG. 12 is a flowchart explaining file truncate processing according to an embodiment of the present invention.

FIG. 12 is a flowchart explaining the file size truncate processing 92 according to an embodiment of the present invention.

The file truncate processing 92 is processing of changing the file size of the file (access target file) of the file system that is being shared by the file sharing 17 in accordance with a request from the computer 20a or 20b.

The flow of the file size truncate processing 92 is now explained taking an example where, when computer 20a is to overwrite the file (access target file) M2 of the hierarchy file system 160, the file size is changed to 0 as a part of such processing.

Processing steps 9200 to 9115 are executed by the file sharing processing program 141. Processing steps 9220 to 9140 are executed by the hierarchy file system processing program 147.

The file sharing processing program 141 receives a request from the computer 20a for changing the size of the file (access target file) M2 to 0, and starts the processing from step 9200.

At step 9205, the file sharing processing program 141 receives a request from the computer 20a for changing the size of the file (access target file) M2 to 0.

At step 9210, the file sharing processing program 141 requests the hierarchy file system processing program 147 to change the size of the file (access target file) M2 to 0.

The hierarchy file system processing program 147 receives the request from the file sharing processing program 141, and starts the processing from step 9220.

At step 9225, the hierarchy file system processing program 147 receives a file truncation request from the file sharing processing program 141.

At step 9230, the hierarchy file system processing program 147 selects the file management structure 83 corresponding to the file M2 of the file management information 144 as the processing target.

At step 9235, the hierarchy file system processing program 147 refers to the processing definition information 833 of the file management structure 83 of the file M2, and calls the truncate processing unit 1473 of the hierarchy file system processing program 147 recorded in the processing definition information 833. The hierarchy file system processing program 147 thereafter ends this processing (step 9240).

The file sharing processing program 141 receives a completion report from the hierarchy file system processing program 147, and then ends this processing (step 9215).

The flow of processing of the truncate processing unit 1473 of the hierarchy file system processing program 147 is now explained with reference to FIG. 13.

<Truncate Processing Unit>

Figure 13:
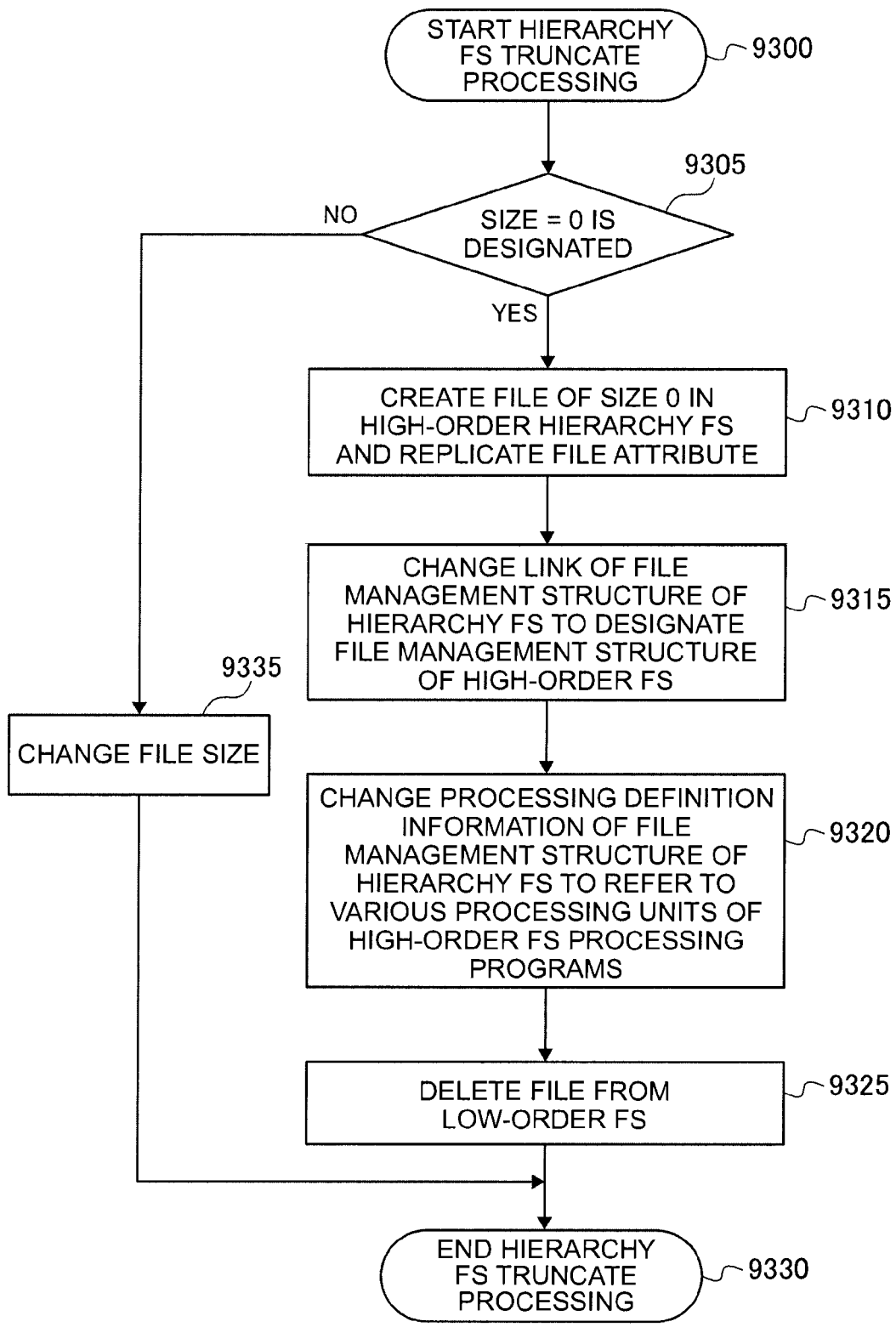
FIG. 13 is a flowchart explaining file truncate processing of a hierarchy file system processing program according to an embodiment of the present invention.

FIG. 13 is a flowchart explaining the file size truncate processing 93 in the truncate processing unit 1473 of the hierarchy file system processing program 147 according to an embodiment of the present invention. As described above, when the truncate processing unit 1473 is called, the processing is started from step 9300.

Here, in a case where the truncate processing is requested to the file (access target file) M2 described above, the following explanation is provided on the assumption that the truncate processing unit 1473 was called at step 9235.

At step 9305, the truncate processing unit 1473 determines whether the size of the file (access target file) to be changed is designated as 0. In this example, 0 is designated. In this case, the routine proceeds to step 9310.

At step 9310, the truncate processing unit 1473 newly creates a file M2, without changing the path name, in the file M2 that is a high-order file system (high access frequency, high-speed file system) in comparison to the file system 16b within the hierarchy file system 160. The size of the newly created file M2 shall be 0. In order to create the new file M2, the create processing unit 1452 of the Angel FS processing program 145 is called. The Angel FS processing program 1452 creates the new file M2 in the high-speed file system 16a, and creates a corresponding file management structure in the file management information 144.

Here, attribute information recorded in the file management structure 83 of the file (access target file) M2 in the hierarchy file system 160 is set to the file M2 that was newly created in the high-speed file system 16a.

At step 9315, the truncate processing unit 1473 changes the link information 834 of the file management structure 83 of the file (access target file) M2 in the hierarchy file system 160 to indicate the file management structure that was created at step 9310.

At step 9320, the truncate processing unit 1473 changes the processing definition information 833 of the file management structure 83 of the file (access target file) M2 in the hierarchy file system 160 to indicate the various processing units of the Angel FS processing program 145.

At step 9325, the truncate processing unit 1473 deletes the file (real file to become the entity of the access target file) M2 that is stored in the low-speed file system 16b. In order to delete the file (real file) M2, the remove processing unit 1465 of the Beast FS processing program 146 is called. The remove processing unit of the Beast FS processing program 146 deletes the file (real file) M2 from the file system 16b, and deletes the corresponding file management structure 84 from the file management information 144.

After the foregoing processing, the truncate processing unit 1473 ends this processing (step 9330).

If the truncation of a file M2 that is of a size other than 0 is requested, at step 9305, the routine proceeds to the processing of step 9335.

At step 9335, the truncate processing unit 1473 changes the entity of the file M2 to the designated size, and then ends this processing. The entity of the file M2 is located as a real file in the file system 16b. Thus, the truncate processing unit 1473 calls the truncate processing unit 1466 of the Beast FS processing program 146, and changes the file size.

<File Management Information After Truncation>

Figure 14:
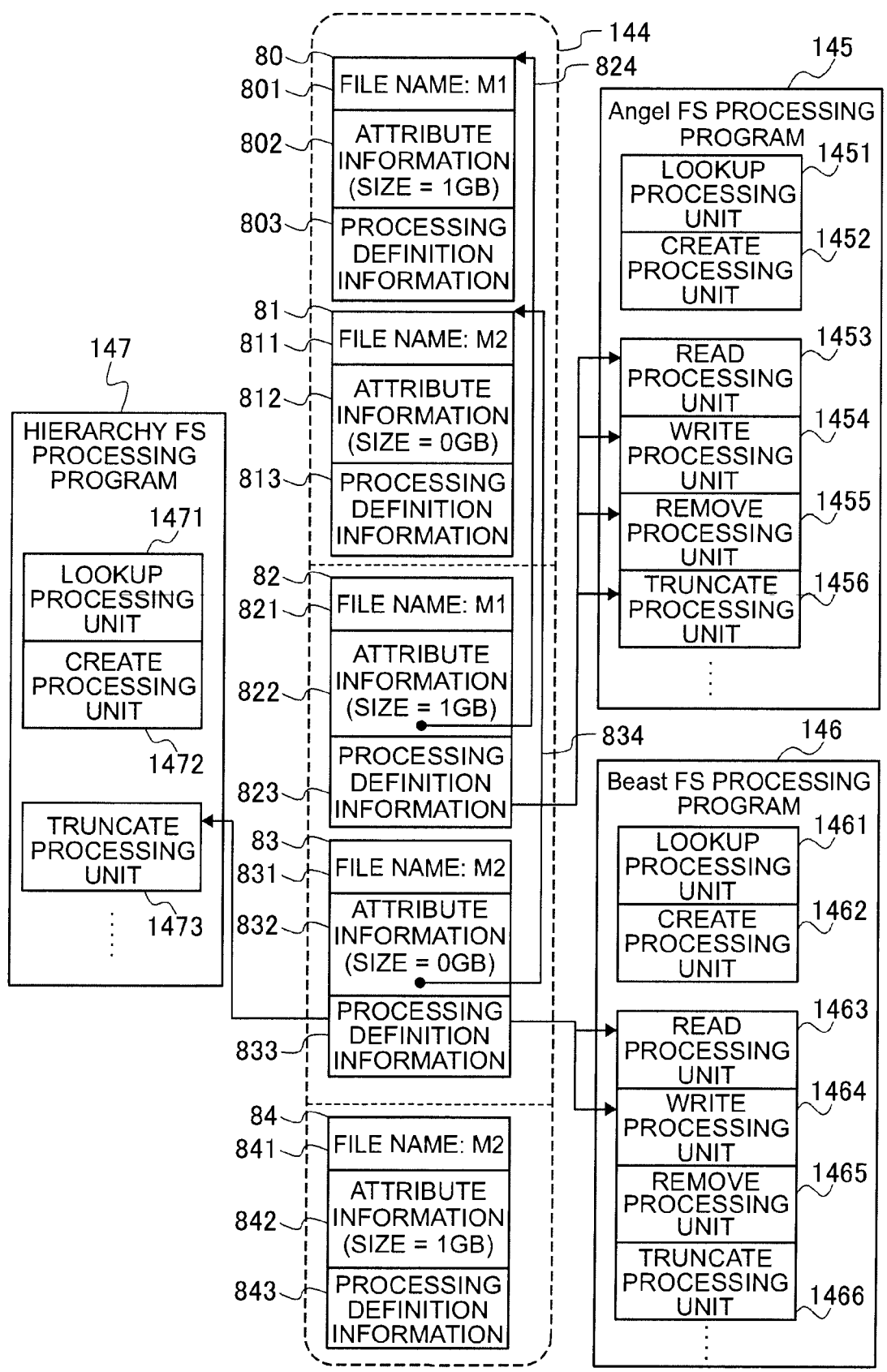
FIG. 14 is a is a configuration diagram explaining file management information after the completion of file truncate processing according to an embodiment of the present invention.

FIG. 14 is a configuration diagram explaining the status of the file management information 144 after the completion of the file size truncate processing explained above.

The file management structure 81 corresponding to the new file M2 of the high-speed file system 16a has been created in the file management information 144. The attribute information of the file management information 144 stores information showing that the size of the new file M2 is 0.

With the file management structure 83 corresponding to the file M2 in the hierarchy file system 160, its link information 834 has been changed to indicate the file management structure 81. Moreover, the processing definition information 833 of the file management structure 83 has been changed to indicate the various types of processing of the Angel FS processing program 145.

<File Write Processing>

Figure 15:
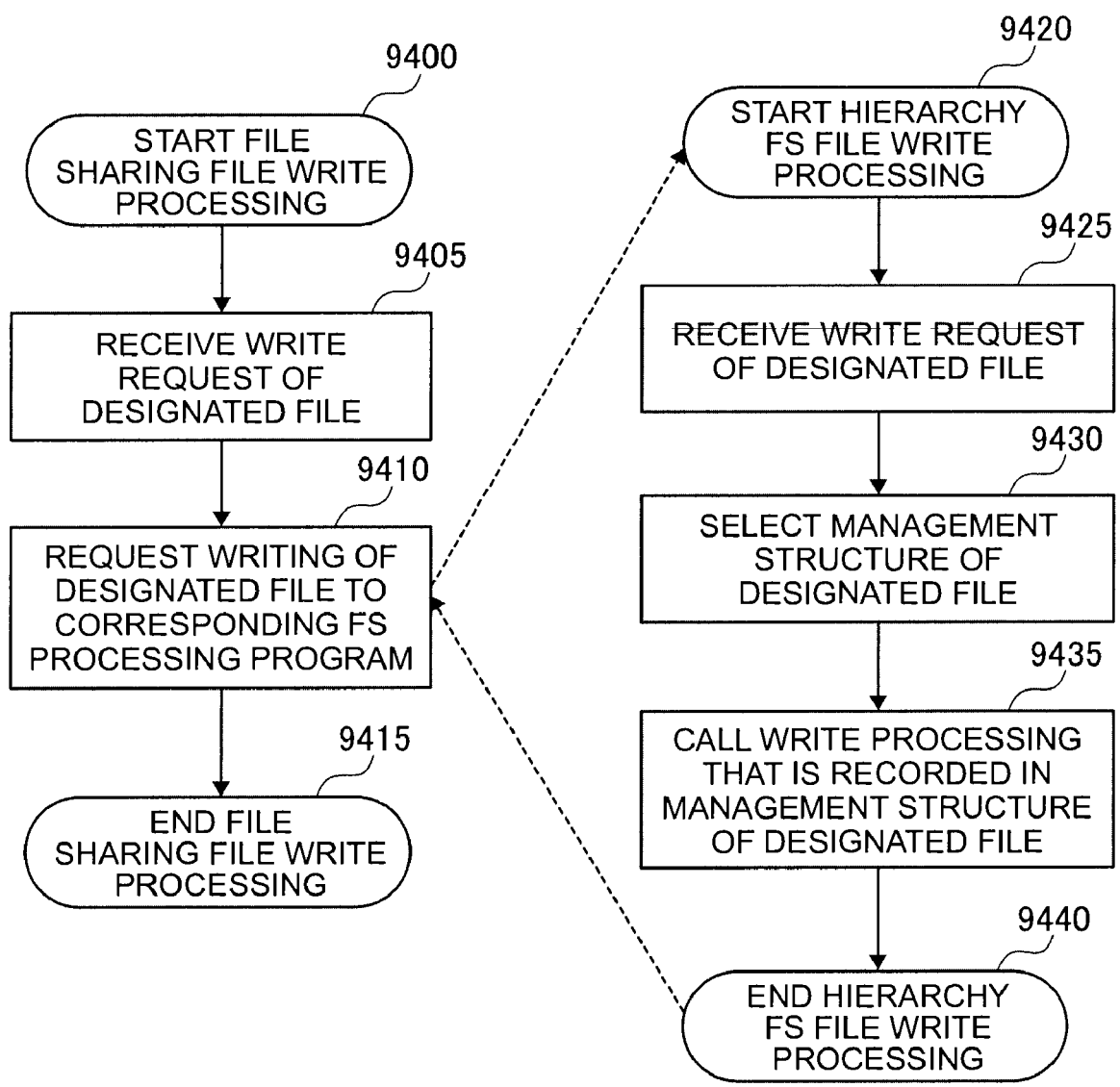
FIG. 15 is a flowchart explaining file write processing according to an embodiment of the present invention.

FIG. 15 is a flowchart explaining the file write processing 94 according to an embodiment of the present invention.

The file write processing 94 is processing of storing data in a file of the file system that is being shared by the file sharing 17 in accordance with a request from the computer 20a or 20b.

The file write processing 94 is now explained by taking an example where the computer 20a requested the truncate processing of the file (access target file) M2 in the hierarchy file system 160, and, after completing the processing, requested the file write processing of the file (access target file) M2.

Processing steps 9400 to 9415 are executed by the file sharing processing program 141. Processing steps 9420 to 9440 are executed by the hierarchy file system processing program 147.

When the file sharing processing program 141 receives a file write request from the computer 20a for writing data into the file (access target file) M2, it starts the processing from the step 9400.

At step 9405, the file sharing processing program 141 receives a file write request from the computer 20a for writing data into file (access target file) M2.

At step 9410, the file sharing processing program 141 recognizes that the file (access target file) M2 is a file of the hierarchy file system 160, and requests the hierarchy file system processing program 147 to write data into the file (access target file) M2.

The hierarchy file system processing program 147 receives the request from the file sharing processing program 141, and starts the processing (step 9420).

At step 9425, the hierarchy file system processing program 147 receives a write request of the file (access target file) M2 from the file sharing processing program 141.

At step 9430, the hierarchy file system processing program 147 selects the file management structure 83 of the new file M2 contained in the file management information 144 as the processing target.

At step 9435, the hierarchy file system processing program 147 refers to the processing definition information 833 of the file management structure 83 of the new file M2, and calls the write processing unit 1454 of the Angel FS processing program 145 recorded in the processing definition information 833.

The write processing unit 1454 of the Angel FS processing program 145 writes the data into the new file M2 of the file system 16a.

At step 9440, the hierarchy file system processing program 147 ends this processing.

The file sharing processing program 141, at step 9415, ends this processing.

<Summary>

Although the present invention was explained based on the embodiment described above, this invention is not limited to the foregoing embodiment, and may be applied to various other modes.

In this embodiment, when the processor 12 receives a file size change request (file size truncation request) from the access request source, it extracts an access target file M2 that is designated in the file size change request from files belonging to the hierarchy file system 160, extracts a file system 16a with high access frequency among a plurality of file systems belonging to the hierarchy file system 160 as a file system that has a higher processing performance than the file system 16b containing the real file M2 as the entity of the access target file M2, creates a new file M2 related to the real file M2 in the extracted file system 16a, associates the created new file M2 and the access target file M2, deletes the real file M2 on the condition that the created new file M2 and the access target file M2 have been associated, and executes data write processing of writing data into the new file M2 on the condition that a data write request of writing data into the access target file M2 is subsequently received from the access request source.

Thus, according to this embodiment, even when overwriting the entire file M2 in cases where the entity of the file M2 exists in the file system 16b, it is possible to prevent the decrease in the data write speed (file overwrite processing speed).

In this embodiment, although the file systems 16a and 16b were set to be different types of file systems; namely, Angel FS and Beast FS, the present invention is not limited thereto, and the file systems 16a and 16b may also be the same type of file system.

When overwriting a file, the file size does not have to be 0. Specifically, in this embodiment, although the file was virtually migrated in accordance with the request of changing the file size to 0 in the file truncate processing, the present invention is not limited thereto, and, for instance, a file of a prescribed size or smaller may be virtually migrated even in cases where the file size is of a prescribed size or smaller.

In the foregoing case, if the new size that was designated at step 9035 is smaller than the prescribed size, the truncate processing unit 1473 of the hierarchy file system processing program 147 creates a file to become the migration destination at step 9310, replicates (copies) data for the portion smaller than the prescribed size from the top of the file to become the migration source, and then executes the subsequent processing steps.

The file entity may also be virtually migrated from the high-order file system to the low-order file system. Specifically, in the foregoing embodiment, although the file entity was virtually migrated from the low-order file system to the high-order file system in the file truncate processing, the present invention is not limited thereto, and, for instance, the file entity may also be virtually migrated from the high-order file system to the low-order file system.

Two or more file systems may be configured as the file system. Specifically, in the foregoing embodiment, although two file systems were used to configure the hierarchy file system 160, the present invention is not limited thereto, and, for instance, the hierarchy file system 160 may be configured from three or more file systems, and the files may be virtually migrated among the file systems belonging to the hierarchy file system 160.

Upon configuring a plurality of file systems belonging to the hierarchy file system 160, each file system may also be established in a single storage device. Specifically, in the foregoing embodiment, although the two file systems 16a, 16b belonging to the hierarchy file system 160 are respectively configured in the volumes 31a, 31b of different storage devices 30a, 30b, the present invention is not limited thereto, and, for instance, two or more volumes in which a single storage device configures two or more file systems may also be provided to the NAS apparatus 10.

Moreover, in the foregoing embodiment, although a case was shown there the file truncation request is a single request, the present invention is not limited thereto, and, for instance, the file entity may be virtually migrated as the processing to be performed in response to the file truncation request described above even when a file truncation request exists as an argument (option) in a file operation processing request such as a file open request.

What is claimed is:

1. A storage apparatus, comprising:
a storage device having a plurality of volumes configured by being separated into different groups based on processing performance as logical storage areas of data; and
a controller having a hierarchy file system that is virtually hierarchized by integrating a plurality of file systems containing files which are hierarchically established on the plurality of volumes, and which manages the hierarchy file system as an access target to an access request source;
wherein, when the controller receives a file size change request from the access request source, the controller extracts an access target file that is designated in the file size change request from the files belonging to the hierarchy file system, extracts a first file system among the plurality of file systems to which a real file to become an entity of the extracted access target file belongs, extracts a second file system to become a virtual migration destination of the real file, creates a new file related to the real file in the extracted second file system, associates the created new file and the access target file, and, upon subsequently receiving a data write request from the access request source for writing data into the access target file, executes data write processing of writing data into the new file.

2. The storage apparatus according to claim 1,
wherein, when the controller receives the file size change request, the controller extracts a file system with a processing performance that is higher than the first file system as the second file system, creates a new file related to the real file in the extracted second file system, associates the created new file and the access target file, deletes the real file on the condition that the created new file and the access target file have been associated, and executes data write processing of writing data into the new file on the condition that a data write request for writing data into the access target file is subsequently received from the access request source.

3. The storage apparatus according to claim 1,
wherein, when the controller receives the file size change request, the controller extracts a file system with a processing performance that is higher than the first file system as the second file system.

4. The storage apparatus according to claim 1,
wherein, when the controller receives the file size change request, the controller deletes the real file on the condition that the created new file and the access target file have been associated.

5. The storage apparatus according to claim 1,
wherein the controller executes processing in response to the file size change request even when the file size change request exists as an argument in a file operation processing request from the access request source.

6. The storage apparatus according to claim 1,
wherein, when the controller receives a file size change request of setting the access target file size to 0 as the file size change request, the controller creates the new file having a size of 0.

7. The storage apparatus according to claim 1,
wherein, when the controller receives a file size change request of setting the access target file size to a prescribed size or smaller as the file size change request, the controller extracts data worth the prescribed size or smaller from top of the real file, and uses the extracted data in the data write processing of writing data into the new file.

8. The storage apparatus according to claim 1, wherein, when the controller associates the created new file and the access target file, the controller executes processing for writing metadata of the real file into the new file.

9. A file control method performed by a storage device having a plurality of volumes configured by being separated into different groups based on processing performance as logical storage areas of data, and a controller having a hierarchy file system that is virtually hierarchized by integrating a plurality of file systems containing files which are hierarchically established on the plurality of volumes, and which manages the hierarchy file system as an access target to an access request source, wherein the controller performs the method comprising:

a step of extracting an access target file that is designated in the file size change request from the files belonging to the hierarchy file system, extracting a first file system among the plurality of file systems to which a real file to become an entity of the extracted access target file belongs, and extracting a second file system to become a virtual migration destination of the real file upon receiving a file size change request from the access request source;

a step of creating a new file related to the real file the second file system extracted in the step of extracting a second file system;

a step of associating the new file created in the foregoing step and the access target file; and a step of executing data write processing of writing data into the new file upon subsequently receiving a data write request from the access request source for writing data into the access target file.

10. The file control method performed by storage device according to claim 9, wherein the controller executes:

a step of extracting a file system with a processing performance that is higher than the first file system as the second file system upon receiving the file size change request;

a step of creating a new file related to the real file in the second file system extracted in the foregoing step;

a step of associating the new file created in the foregoing step and the access target file;

a step of deleting the real file on the condition that the new file created in the foregoing step and the access target file have been associated; and a step of executing data write processing of writing data into the new file on the condition that a data write request for writing data into the access target file is subsequently received from the access request source.

11. A storage system, comprising:

a storage device having a plurality of volumes configured by being separated into different groups based on processing performance as logical storage areas of data; and a file server having a hierarchy file system that is virtually hierarchized by integrating a plurality of file systems containing files which are hierarchically established on the plurality of volumes, and which manages the hierarchy file system as an access target to an access request source; and a computer that is connected to the file server via a communication network and which sends and receives information to and from the file server with the hierarchy file system as an access target;

wherein the file server includes:

a file truncate processing unit which, upon receiving a file size change request from the computer as the access request source, extracts an access target file that is designated in the file size change request from the files belonging to the hierarchy file system, extracts a first file system among the plurality of file systems to which a real file to become an entity of the extracted access target file belongs, extracts a second file system to become a virtual migration destination of the real file, creates a new file related to the real file in the extracted second file system, and associates the created new file and the access target file; and a data write processing unit for executing data write processing of writing data into the new file upon receiving a data write request of writing data into the access target file after receiving the file size change request from the computer.

12. The storage system according to claim 11, wherein, when the file truncate processing unit receives the file size change request, the file truncate processing unit extracts a file system with a processing performance that is higher than the first file system as the second file system, creates a new file related to the real file in the extracted second file system, associates the created new file and the access target file, and deletes the real file on the condition that the created new file and the access target file have been associated.

13. The storage system according to claim 11, wherein, when the file truncate processing unit receives a file size change request of setting the access target file size to 0 as the file size change request, the file truncate processing unit creates the new file having a size of 0.

\* \* \* \* \*